United States Patent Office

3,297,451
Patented Jan. 10, 1967

3,297,451
CITRATE TREATMENT OF CHEESE WITH HIGH TEMPERATURE TREATMENT
Ingmar B. Eggen and Robert H. Bundus, Chicago, Ill., assignors to Beatrice Foods Co., Chicago, Ill., a corporation of Delaware
No Drawing. Filed Apr. 22, 1963, Ser. No. 274,846
6 Claims. (Cl. 99—116)

This application is a continuation-in-part of application Serial No. 796,245, filed March 2, 1959, and now abandoned, and application Serial No. 176,452, filed February 28, 1962.

This invention relates to an improved cheese, preferably cottage cheese, and its method of manufacture. The cheese is substantially free of organisms which would act to reduce its keeping qualities and will remain palatable with or without refrigeration for longer periods of time than is true with conventional cottage cheese. In addition, we make a sterile product having substantially improved keeping qualities.

It is an object of the present invention to prepare cheese having an improved flavor.

Another object is to hasten the cooking time in making cheese.

A further object is to prevent the curd from being too soft in the preparation of cottage cheese.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The method of preparation, it has been discovered, not only improves the flavor of the product but results in an appreciably increased yield. We find that with milk having a W-P-N (whey-protein-nitrogen value of 1 to 3 milligrams per cubic centimeter of milk) notably 2 milligrams per cubic centimeter of milk, we obtain a cheese with a higher yield of cheese per pound of solids. This increase of pounds of curd per pound of solids amounts to at least 1.5 to 3.0 pounds, e.g., 1.8, 2.3, 2.5 and better subject to the total protein composition of milk, i.e., higher the protein the higher the yield. In brief, there is a substantial increase in the pounds of and per pound of solids, e.g., a mean increase of 10% up to as high as 20% increase of yield over the same milk using conventional process; stated another way, the increase is consistent with 12% as the mean between a low of 10% and a high of 14% increase in yield in curd. We obtain yields which are higher than the usual casein coagulated in the milk.

These increases in yield are obtained by heating milk, preferably skim milk, to temperatures higher than those normally used in pasteurization practice followed by certain specific steps hereinafter disclosed. Such high heat treatment and subsequent steps per se are the invention of Peter P. Noznick and Robert H. Bundus, as set forth in the parent applications. We have found two methods of improving the flavor of the final cheese product. One method is to homogenize the skim milk prior to the high heat treatment. The second method is to add citric acid or a non-toxic citrate such as sodium citrate, potassium citrate or ammonium citrate prior to the fermentation step. The use of the citrate can be employed whether or not the skim milk is homogenized prior to the high heat treatment.

By high heat treatment is meant, for example, heating at temperatures and/or hold times substantially above conventionally accepted pasteurization methods, i.e., 161° F. for 15 seconds or 145° F. for 30 minutes. By substantially above, we mean a temperature of 185° F. for a hold time of at least 900 seconds or 300° F. or 305° F. and a hold time of 1 second or less, e.g. substantially instantaneous. As examples of temperatures substantially above conventional pasteurization methods, there are included 255° F. with a holding of 15 seconds; 225° F. with holding of 100 seconds; 262° F. with holding of 100 seconds or for 12 seconds; 280° F. with holding of 10 seconds; 300° F. with holding of one second or 305° F. and holding for 0.7 second, etc. Such heat treatment step, it will be noted, is to be distinguished from conventional pasteurization. Thus, where normal yields from 9% total solids skim milk are about 12 to 13 pounds of curd per 100 pounds of skim milk at a curd total solids content of 20%, our yields are 16 to 18 pounds and even higher per 100 pounds of skim milk at a curd total solids content of 20%. This is quite a marked increase in yield with consequent enhanced economic results and is obtained by our initial step of heat treating the liquid skim milk under suitable temperatures and hold times, the lower the temperature used, the longer the hold time which will be employed, and vice versa.

The curd resulting from any of the several methods to be recited in the subsequent examples has a high water holding capacity, i.e., keeps moist. This is advantageous in that we are able to spray dry the curd and use the dried powder as a filler in food products because of its high water binding quality. We spray dry the curd with or without the whey, usinng spray drying with the whey when an acid product is desired. The spray dried powders find ready use in making cheese cake, fillers for sausages, etc.

The invention is being described and illustrated in connection with and examples of cottage cheese.

When a citrate is added to the skim milk before heat treatment, it is used in small amounts, e.g. 0.1 to 0.2% by weight.

Unless otherwise indicated all parts and percentages are by weight.

EXAMPLE 1.—Cottage Cheese 0.2% of sodium citrate was added to raw sweet skim milk in the normal range of total solids content of about 8.5% is heated up to 262° F. for 100 seconds to heat the skim milk. Cheese thereafter made from this liquid skim milk has many advantages, both product wise and method wise. Apparently, the heating alters the whey proteins so that they remain in the curd and are not lost in the whey. Thereby we obtain a greater yield of curd from the skim milk than normally. The preparation of the cottage cheese thereafter follows conventional procedure.

EXAMPLES 1a, 1b, 1c, 1d, 1e, 1f, 1g

The process we followed as in Example 1 respectively heating up to 275° F. and holding for 100 seconds, heating up to 275° F. and holding for 15 second and in fact heating up to 275° F. and holding for 15 to 100 seconds, and heating up to 265° F. and holding for 60 seconds, heating to 185° F. and holding for 900 seconds, heating up to 255° F. and holding for 15 seconds, heating up to 300° F. and holding for one second.

In Example 1 and Examples 1a to 1g the pH of the curd is between 4.3 to 5.1, usually 4.7 to 5.1.

Holding times of 1 second to 900 seconds and temperatures of 165° F. to 305° F. are used, the time and temperature relationship being indirectly proportional as indicated above.

Temperatures above pasteurization temperatures give better cheese, with higher curd tension and a firmer and at a higher pH.

EXAMPLE 2

Instead of heating up to and holding at 262° F. for 100 seconds, we heat treated, as in Example 1, in another example skim milk having about 9% total solids up to 280° F. and held there for 10 seconds and proceeded to make cottage cheese by accepted practice.

EXAMPLE 3

In this further example, we heated up to and held 300° F. for one second skim milk having a total solids content of about 8.75%. The treatment was otherwise as in Examples 1 and 2.

Also, we used other temperatures and holding times than recited in Examples 1, 2 and 3 to give a heat treatment of the liquid skim milk as distinguished from mere conventional pasteurization which latter did not yield our improved results.

EXAMPLE 4a

This example was similar to Example 1 except that the skim milk was heated to 255° F. and held for 15 seconds at that temperature.

EXAMPLE 5

This example was similar to Example 1 except that the skim milk was heated to 255° F. and held 4 seconds at this temperature. The curd tension measured 54,000 centipoises with milk having a whey-protein-nitrogen value of 3.8 milligrams per cc., as compared with conventional milk pasteurized at 165° F. for 15 seconds which showed a curd tension of 24,250 centipoises with milk having a whey-protein-nitrogen value of 7.4 milligrams. The foregoing shows that an increase of temperature gives a better curd tension.

EXAMPLE 5

This example was the same as Example 1 except that the skim milk was heated to 225° F. for 100 seconds.

These examples were otherwise like Examples 1, 2 and 3.

Instead of using flash cooling, a conventional tubular heat exchanger was used successfully in some examples to effect the cooling.

The cooling in Examples 1, 1a, 1b, 1c, 1d, 1e, 1f, 1g, 2, 3, 4, 4a and 5 was successfully carried out at temperatures within the range of 72° F. to 90° F.

To a separate portion of each of the cooled heat treated skim milk products of the above-identified examples, there was added about 10% by weight of a pure culture of lactic acid producing organism, namely a streptococcus lactic culture. (Alternatively, there can be used *streptococcus creamoris*.) Similarly to other separate portions of each of the cooled heat treated skim milk products of the above-identified Examples 1, 1a through 1g, 2, 3, 4, 4a and 5, there was added about 4% by weight of streptococcus lactic culture.

The amount of added culture was decreased with reduction in temperature of the heat treated cooled milk and increase in culturing time.

The inoculated mixtures were allowed to incubate, as indicated, in one group of examples at 90° F. and in the other group of examples at 72° F. until the curd formed was firm enough to cut. The curd from the high heat treated milk is successfully cut at significantly higher pH's than conventionally pasteurized milk. Conventionally pasteurized skim milk just coagulates at pH 4.6 to 4.7. Whereas the same milk as high heat treated milk as in this invention coagulates consistently and readily at pH 4.7 to 5.0 resulting in better curd tension and we get a firmer curd. If we were to ripen the high heat treated milk at pH 4.5 to 4.6 as usual conventionally, the resultant cooking qualities are imparied. Therefore, we prefer to use a higher cutting pH range achieved in shorter times as much as 1 hour less time than conventional acidity development or curd manufacture.

The curd at 90° F. set in about four hours and that at 72° F. in about 14 hours. The higher the temperature, the more rapid the setting occurred.

The curd had a pH of between about 4.3 to 5.1, varying with the milks from different sources in the examples treated, this being the outside of low and high pH's successfully produced and used by us.

This curd after cutting and at a pH of about 4.3 to 5.1 as true of the particular run is now cooked. For instance, each of the products of the 72° F. culturing and the 90° F. culturing were cooked for 1½ hours at 130° F. In other experiments, each of the products of the 72° F. culturing and the 90° F. culturing were cooked at 160° F. for 2½ hours. Other samples of the cultured curds were cooked at intermediate temperatures of this range, i.e. about 130° to 160° F. for 1 to 3 hours. The longer cooking times and high temperatures are used where more moisture must be removed, and, in each case, to obtain a higher solids content. That is, we preferably cooked to sufficient temperature and for a long enough time to yield a curd containing about 20% total solids, the minimum for a curd when making uncreamed cottage cheese.

On the other hand, in making a creamed cheese where we cooked to an 18% solids curd, the added cream brought the solids content up to about 20% total solids. In some cases, the skim milk by reason of its source and make-up will only produce such an 18% solids content which will be increased by the added cream.

Alternately, in the examples mentioned above, we have also cooked to about 20% total solids and added as much as desired of a lower solids cream, e.g. one containing 12% butter fat, to give an increased solids content above the minimum, i.e. 20% solids.

At this point, it is important to describe that our observations have indicated that by using an adequate cooking time range, for example, of one to three hours, at a high cooking temperature of, for instance, about 130° to 160° F. with a low acidity of approximately pH 4.3 to 5.1, an important result is obtained. That is, all organisms introduced to the product with the said culture inoculum (*S. lactis* or *creamoris*) are destroyed, thereby producing the desired curd.

Variegated cottage cheese

To any one of the described heat treated milks, we add butter fat as butter oil to which has been added fat soluble and/or miscible vegetable colors, e.g., yellow, red, green, etc. which are commercially available and homogenize the colored fat and skim milk and make as described. Preferably, the butter or butter oil is pasteurized or sterilized first to preclude contamination.

This results in a curd with a stable nonleaching color which can be mixed with white curd to form variegated cottage cheese or sold as colored cottage cheese. This product is attractive for consumer use for Christmas salads, etc.

Buttermilk flavored cottage cheese powder

We heat treat the milk, culture the same, and cook the cultured milk as described above.

Then we disperse the curd mechanically in a mixer and spray dry with the whey. This results in a water dispersible stable powder high in water holding characteristics and containing desirable cultured buttermilk characteristics. Such powder is used in buttermilk pancake mixes and other preparations requiring a buttermilk flavor.

Addition of 0.2% of sodium citrate prior to heating the skim milk to 280° F. for 10 seconds produced a firm curd and hastened, i.e. reduced the cooking time. Where the heat treatment following the addition of 0.2% sodium citrate was 262° F. for 100 seconds, the curd was prevented from being soft by the presence of the sodium citrate and the cooking time was also hastened.

Rennet in relatively small amount generally about one-half of the usual amount, i.e. ½ oz. per 1000 pounds skim milk may be employed in the usual manner or preferably with the lactic acid starter, e.g. *S. lactis,* in the conventional manner. A very firm curd results and the presence of the rennet is used to control the firmness of the curd or shorten the coagulation time. In place of enzymes such as rennet, bromelin, pepsin or trypsin may be used alone, but preferably in the amount stated, with the lactic acid-producing organism or starter (*S. lactis*).

Other starters than *S. lactis* described above may be used alone or with rennet, as is well known in the cheese industry. Preferably, a standard inoculum is used which is pure and uncontaminated. Such a starter is prepared from truly sterilized skim milk subsequently inoculated with a pure uncontaminated *Streptococcus lactis* or conventional organism. As will be appreciated, any organisms remaining in the product after incubation are destroyed in the cooking, referred to above, which is carried out within the temperature range of 130° to 160° F. and for one to three hours.

EXAMPLE 6

The heat treated skim milk used in making cottage cheese in accordance with this invention may be prepared by adding 0.2% of sodium citrate and then sterilizing the skim milk, using a temperature by heating up to 280° F. and holding for 10 seconds as described above, evaporating it to 30% total milk solids not fat, and subsequently storing the sterile concentrate until desired at normal temperatures. When it is required to use such sterile concentrate, it is reconstituted with sterile water and employed in making cottage cheese in accordance with this invention. In this example, where the product is stored at low temperature e.g. 35° F. sterilizing conditions are unnecessary and lower temperatures, namely heating to 255° F. and holding for 15 seconds is used for the heat treatment.

If it is not desired to use a sterile liquid concentrate, the sterile concentrate may be spray dried and stored under sterile conditions until required, whereupon the powder is reconstituted with sterile water to provide a sterile skim milk useful for making cottage cheese according to this invention.

Following the cooking step described above at which time any organisms remaining in the curd are destroyed, the whey is subjected to the usual draining. That is, in each of the aforesaid examples, this is done by simply opening the valve in the vat containing the curd and whey at its cooking temperature and straining the fluid pass through a simple strainer by gravity. We prefer to drain the whey containing the suspended curd by passing the same to a sterile basket type centrifuge which removes the whey mechanically and rapidly.

The hot drained curd is cooled and rinsed preferably with sterile cold water at 35° F. The cooling water was also successfully used at temperatures of 40° F., 50° F., 60° F. and up to 70° F. and the rinsing and cooling was repeated in some instances but usually one rinse with the cool sterile water was adequate. Where the basket centrifuge was used, the hot curd was similarly cooled as described. We also successfully used countercurrent cooling and washing with the sterile cold water and re-centrifuging where desired although one rinsing and cooling was usually adequate. The curd was cooled to the temperatures above set forth namely 35° F. to 70° F., and was now drained in the usual manner of free water. It was then ready for packing or for creaming where a creamed cottage cheese was the end product desired.

EXAMPLE 7

Raw sweet skim milk having 8.5% solid content was homogenized at 8000 p.s.i. at 100° F. and then was heated up to 262° F. for 100 seconds. The product was cooled to 90° F. and 10% of *Streptococcus lactis* added. The mixture was allowed to incubate for 4 hours. This curd was then firm enough to cut. The curd was cut and then heated at 130° F. for 1.5 hours. The whey was then subjected to the usual draining. The hot drained curd was cooled and rinsed with sterile cold water at 35° F. The product had improved flavor over conventionally prepared cottage cheese.

EXAMPLE 8

The procedure of Example 7 was repeated except 0.2% of sodium citrate was added prior to the homogenization of the raw skim milk.

The homogenization prior to the high heat treatment can be carried out at 5000 to 10,000 p.s.i. at a temperature of 90 to 180° F.

The protein in the cheese derived from whey protein and casein is identified by analytical study of sulfur to nitrogen ratio in the milk. The lactalalbumin fraction of milk contains a higher fraction of sulfur bearing amino acids, also phosphorus to nitrogen. The phosphorus is in the casein and the lactalalbumin contains none. Hence, the ratio is less. The increase in the curd is denoted by the increase by the whey-protein in the curd. Cottage cheese having a protein composition such that about 20% of the protein is whey-protein distinguished from conventional cottage cheese which only contains whey-protein distinguished from conventional cottage cheese which only contains whey-protein to a limited extent as may be included in the whey or liquid fraction but never over 5% at best. This is important in that it indicates a high yield, i.e., extracting more protein from any given milk and utilizing it in the cheese as distinguished from it being lost if used as feed. In conventional cheese whey-protein which is colloidal material is lost in the liquid whey as a colloidal suspension during draining and washing. That is, whey-protein is retained in intimate contact with a casein and the phenomenon is not understood but appears to be and is believed to be coprecipitate with casein, i.e., we get the lactalalbumin fraction precipitated as well since both are insoluble in the whey liquid. It has been found that 70% or more of the whey protein nitrogen, e.g. 75%, 80% or 85% of the whey-protein nitrogen goes into the cottage cheese having a curd with a high percentage of lactalalbumin. When the casein remains constant and the whey-protein increases, the percent increase in yield of cottage cheese increases. When the casein increases, however, we get a lower increase in yield. That is to say in normal milk when the ratio of casein to whey-protein is high, e.g. 2½% to 5% to whey-protein ½ to 1% is high the increase in yield is low. When the ratio is low the yield is high. In brief, the percent increase in yield will vary as the ratio of casein to whey-protein varies. Thus, as the percent of whey-protein increases the yield also increases because of the inclusion of the whey-protein in the cheese. The percent increase in yield between conventional process milk and our high heat process of this invention will be greater as the ratio of casein to whey-protein is lower. As stated, it is desirable to have the whey-protein nitrogen ratio low, e.g. 1 to 3 milligrams, preferably, plus or minus 1 gives the maximum yield of cottage cheese or cheese of any type.

As stated herein, the high heat treatment may consist in heating the milk up to 185° F. and holding for 900 seconds, heating up to 195° F. and holding for 200 seconds, and heating up to 225° F. and holding for 100 seconds at the temperatures recited. We have also successfully heated the milk to 262° F. and held at that temperature for 100 seconds. We have heated up to 255° F.

and held for 4 seconds, to 305° F. and held for 0.7 second. The curd coagulates as explained above at a pH 4.3 and 5.1 and preferably 4.8 to 5.1. The increase in whey-protein content increases the gel strength of the curd and a cheese made from high heat-treated milk, i.e., heated up to 255° F. temperature and held for 15 seconds time such that the skim milk so heat-treated fails in a curd tension range suitable for curd cutting.

In all cases there is an increase in yield which is measured in pounds of curd, as high as 20% per pounds of solids.

We claim:

1. In a process for making cheese by heating skim milk at a high temperature within the range of 185° F. and holding for 900 seconds and 305° F. and holding for not over 1 second, the time being inversely proportional to the temperature, and culturing the said previously high heat treated milk to a pH of 4.8 to 5.1 and cooking the cultured skim milk to destroy any remaining culture organism, the improvement comprising homogenizing the skim milk prior to said high temperature treatment.

2. A process according to claim 1 wherein there is added a small amount of a member of the group consisting of citric acid and non-toxic salts thereof prior to said high heat treatment.

3. A process according to claim 2 wherein said member is sodium citrate.

4. In a process of making cottage cheese by heating skim milk at a high temperature within the range of 185° F. and holding for 900 seconds and 305° F. and holding for not over 1 second, and culturing the said previously high heat treated milk to a pH of 4.8 to 5.1 and cooking the cultured skim milk to destroy any remaining culture organisms, the improvement comprising adding a small amount of a member of the group consisting of citric acid and non-toxic salts thereof prior to said high heat treatment.

5. A process according to claim 4 wherein said member is sodium citrate.

6. A process according to claim 5 wherein the citrate is used in an amount of 0.1–0.2% by weight of the skim milk.

References Cited by the Examiner

UNITED STATES PATENTS

| | | | |
|---|---|---|---|
| 2,326,132 | 8/1943 | Fear | 99—116 |
| 2,558,256 | 6/1951 | Killengreen | 99—116 |
| 2,564,374 | 8/1951 | Roland | 99—116 |
| 2,719,793 | 10/1955 | Page et al. | 99—116 |
| 2,743,186 | 4/1956 | Kraft et al. | 99—116 |

OTHER REFERENCES

Mather et al., "Studies on the Favor of Creamed Cottage Cheese," reprinted from Journal of Dairy Science, May 1959, vol. XLII, No. 5, pp. 809–815.

Rogers, Fundamentals of Dairy Science, 1928, The Chemical Catalog Co., Inc., pp. 21–22.

A. LOUIS MONACELL, *Primary Examiner.*

ABRAHAM H. WINKELSTEIN, D. M. STEPHENS, *Assistant Examiners.*